United States Patent
Putkinen

(10) Patent No.: US 8,350,501 B2
(45) Date of Patent: Jan. 8, 2013

(54) DC/DC BRIDGE

(75) Inventor: Esa Putkinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 396 days.

(21) Appl. No.: 12/724,197

(22) Filed: Mar. 15, 2010

(65) Prior Publication Data

US 2010/0171454 A1 Jul. 8, 2010

Related U.S. Application Data

(63) Continuation of application No. PCT/FI2008/000098, filed on Sep. 4, 2008.

(30) Foreign Application Priority Data

Sep. 13, 2007 (FI) ..................................... 20070700

(51) Int. Cl.
*H02P 1/00* (2006.01)
(52) U.S. Cl. ............... 318/139; 318/400.29; 318/200.26
(58) Field of Classification Search .................. 318/139, 318/400.29, 400.26, 400.09, 801, 803, 806; 323/282; 363/98
See application file for complete search history.

(56) References Cited

U.S. PATENT DOCUMENTS

| 6,131,692 | A | 10/2000 | Kawasuji |
| 2005/0168168 | A1 | 8/2005 | Elliott |
| 2012/0049770 | A1 * | 3/2012 | Bouchez et al. ............... 318/139 |

FOREIGN PATENT DOCUMENTS

| JP | 3-207282 A | 9/1991 |
| JP | 3-216476 A | 9/1991 |
| JP | 10-164888 A | 6/1998 |
| JP | 2005-82104 A | 3/2005 |
| WO | WO-2004/070933 A1 | 8/2004 |

* cited by examiner

*Primary Examiner* — Karen Masih
(74) *Attorney, Agent, or Firm* — Birch, Stewart, Kolasch & Birch, LLP

(57) ABSTRACT

DC/DC bridge for controlling a direct-current load (M1), which bridge is provided with controllable semiconductor switches (S11-S14, S21-S26) and with a control unit (BC1). The bridge comprises two bridge sections (B11, B12), at least the first bridge section (B11) of which is controlled with pulse-width modulation (PWM) to regulate the current magnitude, and which bridge comprises a determination of the current of the direct-current load (M1). The second bridge section (B12) conducts direct current when the determined value (2) of the current of the direct-current load differs from zero by more than the limit value (1) of the current.

17 Claims, 5 Drawing Sheets

DC/DC BRIDGE

Figure 1:
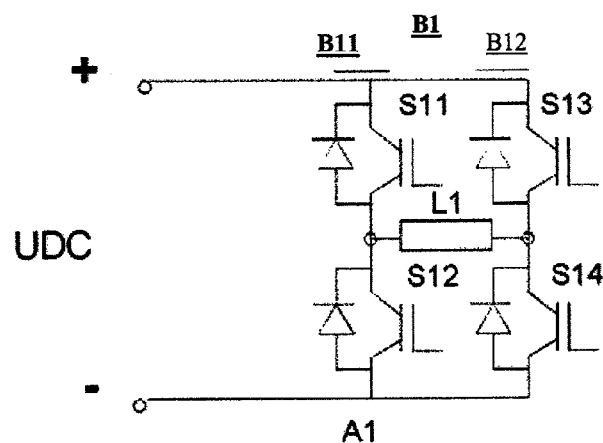

This application is a Continuation of copending PCT International Application No. PCT/FI2008/000098 filed on Sep. 4, 2008, and for which priority is claimed under 35 U.S.C. §120; and this application claims priority of Application No. 20070700 filed in Finland on Sep. 13, 2007 under 35 U.S.C. §119; the entire contents of all are hereby incorporated by reference into the present application.

The object of this invention is a DC/DC bridge provided with a control unit for controlling a direct-current load, said bridge having a power stage provided with controllable semiconductor switches and comprising two bridge sections, of which the control method of one bridge section is selected with control criteria and the other section is controlled with PWM for regulating the magnitude of the current.

Elevator motor drives can be either alternating-current or direct-current motor drives. The drives can be controlled e.g. with PWM (Pulse-Width Modulation). Alternating-current motor drives have become common nowadays, in particular because of the simple structure of alternating-current motors. However, direct-current motor drives are still in use. Neither is it always appropriate to replace a direct-current motor drive with an alternating-current motor drive, because e.g. gearless direct-current motor drives and the direct-current motors used in them are durable and it is therefore unnecessary to replace them with alternating-current motor drives. Besides, replacing the motor entails relatively high costs.

Publication WO2004070933 discloses a DC/DC bridge in which the first bridge section is controlled with pulse-width modulation and the second bridge section conducts direct current.

The purpose of this invention is to eliminate the drawbacks of prior art and to achieve a new kind of PWM-controlled DC/DC bridge of a direct-current load, such as of a direct-current motor. One solution according to the invention is also based on a principle of power electronics topology, wherein it is possible to utilize the technology of alternating-current drives in the control of direct-current motors.

The solution according to the invention is described in detail in the claims below.

The DC/DC bridge according to the invention for controlling a direct-current load is provided with controllable semiconductor switches and with a control unit. The bridge according to the invention comprises two bridge sections, of which at least the first bridge section is controlled with pulse width modulation to regulate the magnitude of the current. The bridge according to the invention comprises a determination of the current of the direct-current load. The second bridge section conducts direct current when the determined value of the current of the direct-current load deviates from zero by more than the limit value of the current, and the second bridge section is otherwise controlled with pulse width modulation (PWM). Determination of the current can be done e.g. by measuring the current, or the current can be estimated on the basis of the modulation index. In this context determination of the current also refers to determining the use of the reference value of the current. The aforementioned limit value of current can be determined in advance or it can change dynamically as a function of some criterion, such as the speed of the motor. The determination of the limit value can be based e.g. on the parameters of the motor, such as on the rated value of the motor current, or it can be based on the parameters of the control, such as on the accuracy of the determination of the current of the DC/DC bridge. In this case the determination of the limit value can be based e.g. on the resolution capability of the current sensors or on the offset of the measuring signal of the current. Furthermore, it can be based on the accuracy of the estimation of the current or e.g. on the noise level of the equipment. The limit value can be determined also on the basis of the instantaneous measurement of the current. By means of the aforementioned limit value of current it is possible to define a current range in the environs of zero, in which the second bridge section is controlled by modulation when the second bridge section conducts direct current outside the current range defined with the limit values.

The modulation index of pulse-width modulation refers to the relative conducting time of a switch i.e. the ratio of the conducting time to the length of the switching cycle.

In one embodiment of the invention the positions of the switches of the second bridge section are selected on the basis of the polarity of the regulation of the current of the direct-current load so that when the switch component fitted to the negative intermediate circuit busbar of the second bridge section is conducting, the increase in the modulation index of the PWM control of the first bridge section increases the current of the direct-current load, while when the switch component fitted to the positive intermediate circuit busbar of the second bridge section is conducting, the increase in the modulation index of the PWM control of the first bridge section decreases the current of the direct-current load.

In one embodiment of the invention, in the situation in which the control method of the second bridge section changes, i.e. transfers from direct-current-conducting control to PWM control, or vice versa, the modulation index H of the first bridge section, and possibly the modulation index (1−H) of the second bridge section derived from this, is increased by the value E, which is determined on the basis of the position of the switches of the second bridge section as well as on the basis of the transfer direction of the control. The transfer direction refers to the direction of the transfer of the control of the second bridge section between the direct-current-conducting state and the PWM-controlled state. When the switch component fitted to the negative intermediate circuit busbar of the second bridge section conducts direct current, if it transfers to PWM control the modulation index of the first bridge section is increased by the value E, which is obtained from the equation:

$$E = \frac{(1 - H_0)}{2}.$$

Here $H_0$ refers to the modulation index of the first bridge section at the moment when the control method of the second bridge section changes. Correspondingly, when the switch component fitted to the positive intermediate circuit busbar of the second bridge section conducts direct current, if it transfers to PWM control the modulation index H of the first bridge section is increased by the value E, which is obtained from the equation:

$$E = \frac{(H_0 - 1)}{2}.$$

When the second bridge section is controlled with the PWM control, if the second bridge section starts to conduct direct current via the switch component fitted to the negative intermediate circuit busbar, the modulation index H of the first bridge section is increased by the value E, which is obtained from the equation: $E = H_0 - 1$. Correspondingly, when the second bridge section is controlled with the PWM control, if the second bridge section starts to conduct direct current via the switch component fitted to the positive intermediate circuit busbar, the modulation index H of the first bridge section is increased by the value E, which is obtained from the equation: E=1 $H_0$. If E achieves a negative value, of course, the modulation index is reduced.

In one embodiment of the invention the first bridge section comprises two semiconductor switch units connected in series and also the second bridge section comprises two semiconductor switch units connected in series. In this case the power handling capacity of the aforementioned semiconductor switch units of the second bridge section is fitted to be essentially one-half of the power handling capacity of the aforementioned semiconductor switch units the first bridge section.

In one embodiment of the invention the first bridge section comprises two arms connected in parallel, in which first bridge section the semiconductor switches of the bridge arms connected in parallel are controlled with PWM to form a PWM-controlled bridge section. In this case the construction can also be switched to control an alternating-current load or a direct-current load and the construction is controllable according to the load connected.

With the invention at least one of the following advantages is achieved:
- when the second bridge section is controlled in the pulse-width modulation range, which is defined with limit values in the environs of the zero value of the current, it is possible to prevent the kind of unstable behavior of the current regulator in the proximity of the zero point of there current, in which the switches of the second bridge section switch between the positive and the negative intermediate circuit busbar at a high frequency of the current regulator under the control of the changing polarity. This kind of switching occurring at a high frequency may cause EMC interference and vibration of the motor.
- When the DC/DC bridge is controlled as presented in the invention, the switches of the second bridge section can be dimensioned for a smaller power handling capacity than those of the first bridge section, because at large currents the second bridge section conducts direct current, and thus no switching dissipation then occurs. The power handling capacity of the second bridge section can in this case be essentially one-half of the power handling capacity of the first bridge section.
- When the first bridge section comprises two branches connected in parallel and the second bridge section comprises one arm, it is possible to use three-arm topology in a direct-current drive according to the invention as well as normal alternating-current drive. In this case the DC/DC bridge can be controlled according to the load connected. The load type can be reported to the bridge with parameters, or the bridge can also perform learning of the load type e.g. by modulating the bridge arms and by measuring the current flowing in the bridge arms.

Figure 2:
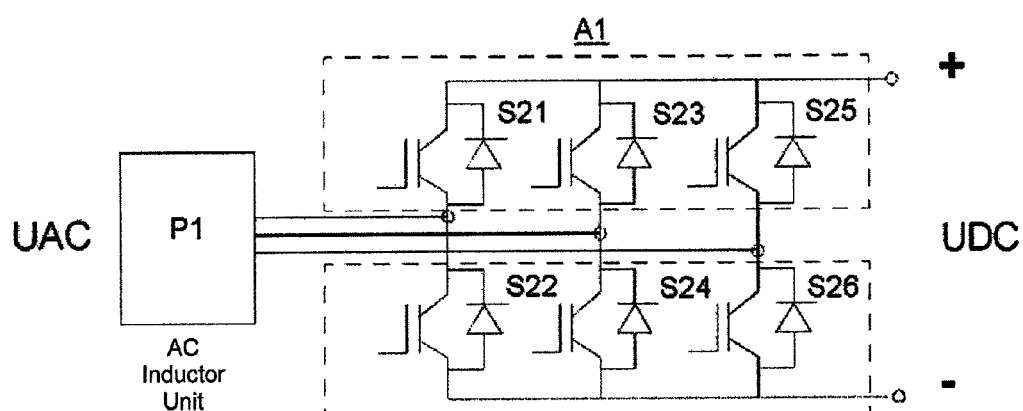
Figure 5:
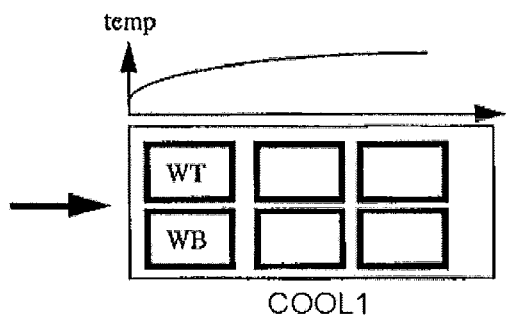
Figure 3:
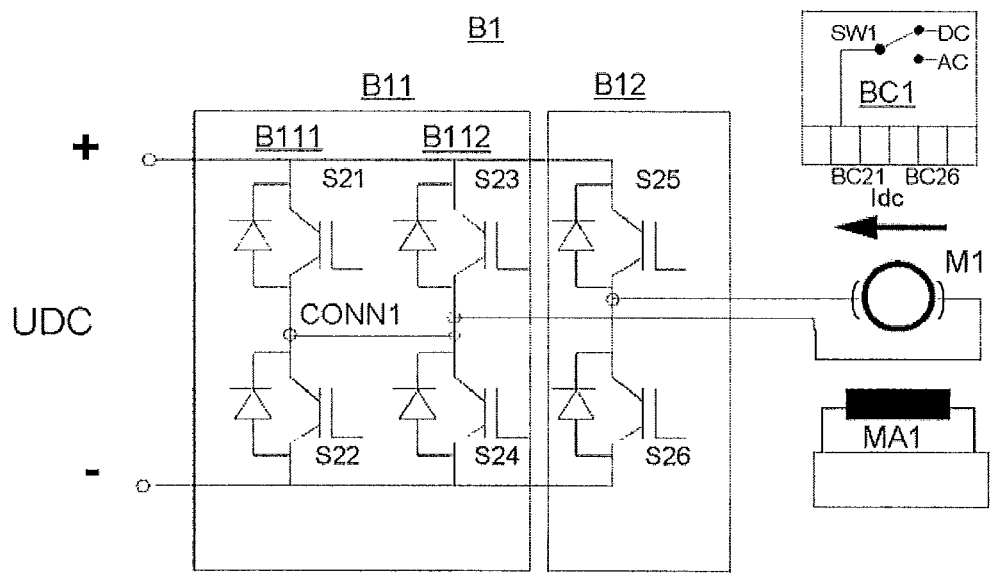
Figure 4:
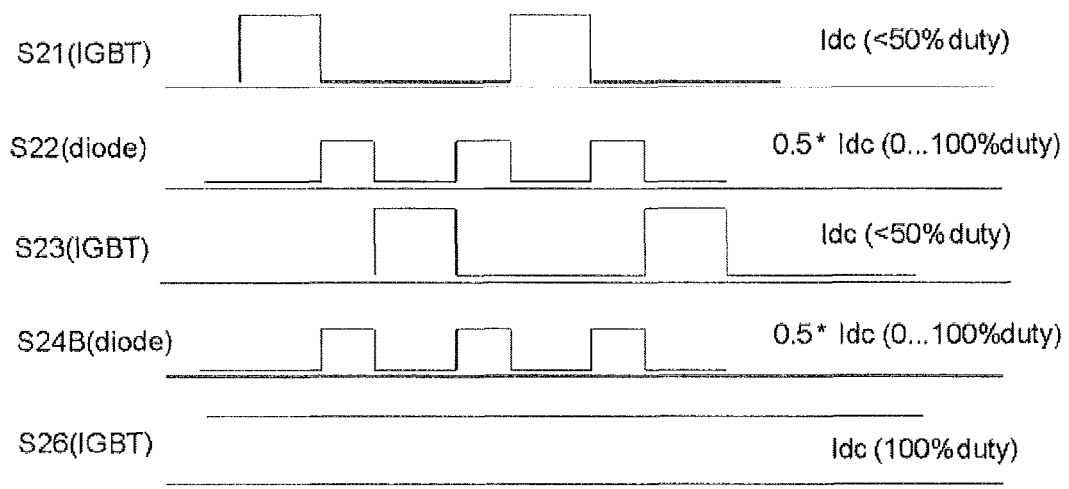

In the following, the invention will be described in more detail by the aid of an embodiment with reference to the attached drawings, wherein FIG. 1 presents a direct-current bridge according to the invention, FIG. 2 presents the network bridge of an alternating-current drive, FIG. 3 presents a direct-current drive according to the invention, comprising a DC/DC bridge according to the invention, FIG. 4 presents a timing diagram of a DC/DC bridge according to the invention, FIG. 5 presents the layout and cooling of the semiconductor switches of the DC/DC bridge according to the invention.

Figure 6:
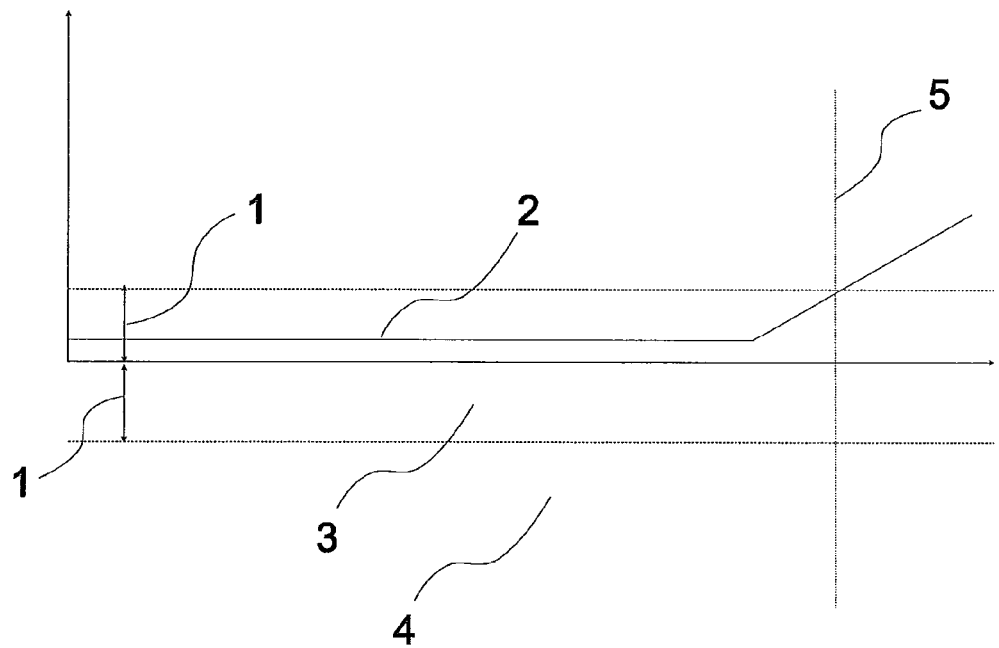
Figure 7:
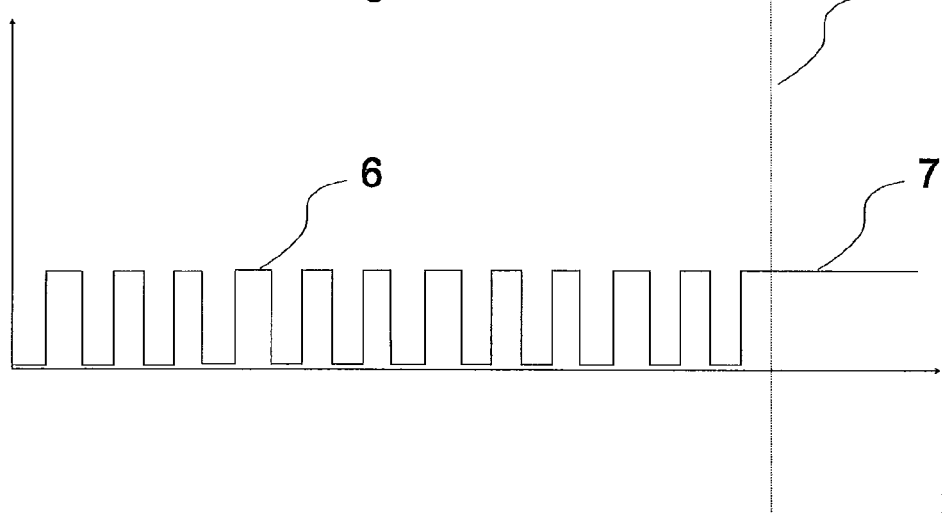
Figure 8:
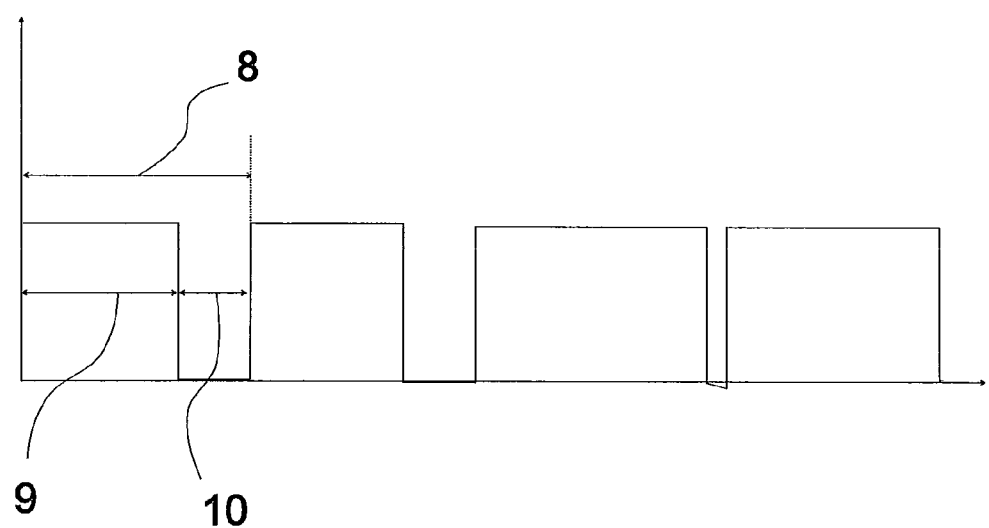

FIG. 6 presents the selection of the control of the second bridge section,

FIG. 7 presents the control pulses of the second bridge section with different controls, and FIG. 8 presents pulse-width modulation.

FIG. 1 presents a PWM-controlled H-bridge B1 of a direct-current motor drive e.g. intended for an elevator application. It comprises two bridge sections B11 and B12, connected to a direct-current source UDC, each containing controllable semiconductor switch units S11-S14 for the positive and negative poles, consisting of e.g. an inverse parallel connection of an IGBT transistor and a diode. The bridge supplies a direct-current load L1, such as the direct-current motor of an elevator. Since according to the invention the second bridge section B12 conducts direct current when the determined value of the current of the direct-current load differs from zero by more (4) than the limit value of the current, and in this case no switching dissipation thus occurs, the switches of the second bridge section B12 can be dimensioned for a smaller power handling capacity than those of the first bridge section B11. The power handling capacity of the second bridge section B12 can in this case be essentially one-half of the power handling capacity of the first bridge section B11.

FIG. 2 presents a network bridge A1 as used in a prior-art three-phase alternating-current drive to rectify the alternating voltage of the network UAC into a direct voltage UDC, and an alternating-current inductor unit P1 connected before it. The bridge has in the upper and lower arms controllable semiconductor switches S21-S26, which are connected to each network phase and which may also consist of e.g. an inverse parallel connection of an IGBT transistor and a diode.

FIG. 3 presents a DC/DC bridge B1 according to the invention, with which an alternating-current motor M1, in which flows a direct current Idc, is controlled. The bridge is controlled with the control unit BC1. Magnetization of the motor is accomplished using a separate magnetizing unit MA1, which is controlled in a manner known in itself.

The DC/DC bridge according to FIG. 3 contains two bridge sections B11, B12. The first bridge section in the bridge according to FIG. 3 comprises two branches B111 and B112, both of which comprise the semiconductor switch units S21-S24 of FIG. 2. Here the branches of the bridge are connected to each other on the circuit board with the connector CONN1, but they can also be connected outside the circuit board e.g. with a connection cable. The second section B12 of the bridge comprises one arm, in which are the semiconductor switch units S25-S26. Thus there are three arms in the whole bridge, corresponding to a three-phase AC/DC bridge. For each semiconductor switch is a controller BC21-BC26 in the control unit BC1.

The modulation of the DC/DC bridge according to the invention occurs as follows: The PWM-controlled direct-current drive according to the invention can use the same type of semiconductor switches S11-S14 or S21-S26 for PWM control as an alternating-current drive. When using a DC/DC bridge according to FIG. 3, the DC drive can be selected e.g. with the switch SW1 in the control unit. In this case zero frequency (the field does not rotate) is used instead of alternating current. In the direct-current drive of the invention, not all of the semiconductor switches have to switch a high-frequency PWM control signal, typically of a frequency of a few kHz; two of the switches, S13 and S14, or S25 and S26, can be used to select the torque direction (up/down), and the switches in question conduct pure DC current. The switches S11 and S12 or S21-S24 used for PWM control are turned on/off at a frequency of a few kHz to control the magnitude of the current Icd (the torque). When the magnitude of the current IDC (2) deviates from zero by more than the limit value (1) of the current, the switches S13 and S14 or S25 and S26 conduct direct current, and otherwise the aforementioned switches are controlled with PWM.

The greatest power dissipation occurs in the switches performing the PWM control. In one embodiment of the invention according to FIG. 3, the switches used for PWM control are turned into conduction alternately in different arms, so the switches in question are only operated for about 50% of normal conduction time or less. This action is visualized in the timing diagram of FIG. 4, which represents the conduction times of switches S21, S23 and S26 as well as the conduction times of the diodes S22 and S24. In another embodiment of the invention according to FIG. 3, the switches used for PWM control are turned into conduction simultaneously in the arms connected in parallel, so the switches S21 and S23, and on the other hand the switches S22 and S24, conduct simultaneously.

From a thermal point of view, the embodiment of the invention according to FIG. 3 provides the advantage that the power stage of an alternating-current drive can be fully utilized in a direct-current drive. Thermal dissipation in the IGBTs used in the circuit is typically double the dissipation in switches that are not used in PWM control. On the other hand, in the embodiment of the invention according to FIG. 1, the switches S13, S14 that conduct direct current can be dimensioned for a power handling capacity of essentially one-half of that of the switches 511, S12 that are controlled with modulation.

In practice, direct-current switches may have higher dissipation because direct-current losses are slightly greater than switching-PWM-losses. Therefore, switches S11 and S12 or S25 and S26 are placed on the air intake side (arrow) of the cooling segment COOL1 (FIG. 5) as it is cooler than the middle part of the segment or the air exit side, as indicated by the temperature curve TEMP.

FIG. 6 presents the selection of the control of the second bridge section B12. The control is selected on the basis of the value 2 of the determined current. When the determined value of the current is within the range 3 set with the limit values 1, the second bridge section B12 is controlled with the PWM control. When, on the other hand, the determined value 2 of the current is outside this range 4, the second bridge section B12 conducts direct current. The time 5, at which the aforementioned value of the current moves outside the range set by the limit values, is also marked in FIG. 6. Likewise, FIG. 7 presents a control signal of a switch component S13, S14, S25, S26 of the second bridge section B12, which changes from a PWM signal into a DC signal when the determined value of the current 2 deviates outside the range 3 determined by the limit values 1.

FIG. 8 presents a PWM signal, the modulation index of which refers to the ratio of the switched-on time 9 of the switch to the switching cycle 8. The modulation index can in this case receive values between 0 . . . 1.

It is obvious to the person skilled in the art that the different embodiments of the invention are not limited solely to the example described above, but that they may be varied within the scope of the claims presented below. Also other components fully controllable from the gate can be used as switches, in addition to an IGBT. In addition to the direct-current motor, the load can also be e.g. the brake magnet of the elevator.

The arrangement according to the invention can be used in an extensive range of electric drives. By applying the principle according to the invention it will be possible to cover the power range of the direct-current drives of elevators with the latest IGBT technology. Alternating-current drive modules and direct-current drive modules can be assembled on the same production line, and the application can be selected mainly with software control.

The invention claimed is:

1. DC/DC bridge for controlling a direct-current load, said DC/DC bridge comprising;
   controllable semiconductor switches and a control unit,
   said DC/DC bridge being configured to determine the current of the direct current load and having two bridge sections,
   a first bridge section controlled via pulse-width modulation to regulate the current magnitude; and
   a second bridge section which conducts direct current when the determined value of the current of the direct-current load deviates from zero by more than the limit value of the current, and being otherwise controlled with pulse-width modulation, PWM.

2. The DC/DC bridge according to claim 1 above, wherein the limit value of current is selected:
   on the basis of the speed of the motor.

3. The DC/DC bridge according to claim 1, wherein the DC/DC bridge regulates the current of the direct-current load by changing the modulation index of the pulse-width modulation, and the positions of the switches of the second bridge section are selected on the basis of the polarity of the regulation of current of the direct-current load.

4. The DC/DC bridge according to claim 1, wherein the first bridge section is controlled with pulse-width modulation, PWM, the modulation index of which is H, the second bridge section either conducts direct current or it is controlled with pulse-width modulation, PWM, only in the environment defined by the limit value of current, which modulation index is derived from the modulation index of the first bridge section, and which modulation index of the second bridge section receives the value (1−H), and when the control method of the second bridge section changes, the value of the modulation index H of the first bridge section is fitted to increase by the value (E), which value (E) is determined on the basis of the position of the switches of the second bridge section of the DC/DC bridge as well as on the basis of the transfer direction of the control.

5. The DC/DC bridge according to claim 1, wherein the first bridge section further comprises two semiconductor switch units connected in series, the second bridge section further comprises two semiconductor switch units connected in series, and the power handling capacity of the semiconductor switch units of the second bridge section is fitted to be essentially one-half of the power handling capacity of the aforementioned semiconductor switch units of the first bridge section.

6. The DC/DC bridge according to claim 1, wherein the first bridge section comprises two arms connected in parallel, in which first bridge section the semiconductor switches of the bridge arms connected in parallel are controlled with pulse-width modulation, PWM, to form a PWM-controlled bridge section.

7. The DC/DC bridge according to claim 6, wherein the semiconductor switches of the PWM-bridge arms conduct simultaneously.

8. The DC/DC bridge according to claim 6, wherein the semiconductor switches of the PWM bridge arms conduct alternately.

9. The DC/DC bridge according to claim 8, wherein the switches used for PWM control conduct for essentially at most 50% of the conduction time of the bridge section.

10. The DC/DC bridge according to claim 6, wherein the bridge may optionally be used in both a direct-current drive and in an alternating-current drive.

11. The DC/DC bridge according to claim 6, wherein the bridge may be switched to control an alternating-current load or a direct-current load and is controllable according to the load connected.

12. The DC/DC bridge according to claim 10, wherein the control unit comprises a switch for selecting direct-current drive/alternating-current drive.

13. The DC/DC bridge according to claim 1 above, wherein the direct-current load is a direct-current motor.

14. The DC/DC bridge according to claim 1 above, wherein the limit value of current is selected on the basis of at least one parameter of the motor, such as the rated current of the motor or the source voltage of the motor.

15. The DC/DC bridge according to claim 1 above, wherein the limit value of current is selected on the basis of the instantaneous measurement of motor current.

16. The DC/DC bridge according to claim 1 above, wherein the limit value of current is selected on the basis of the accuracy of the determination of the current of the DC/DC bridge, such on the basis of the resolution capability of the sensors, the offset voltage of the measuring signal of the current, or the accuracy of the estimation of any current.

17. The DC/DC bridge according to claim 1 above, wherein the limit value of current is selected on the basis of the noise level of the equipment.

* * * * *